United States Patent Office.

FRIEDR. ADOLF REIHLEN, OF STUTTGART, WÜRTEMBERG, GERMANY.

PROCESS OF MANUFACTURING WINE.

SPECIFICATION forming part of Letters Patent No. 239,842, dated April 5, 1881.

Application filed September 3, 1880. (No specimens.) Patented in France February 25, 1880.

*To all whom it may concern:*

Be it known that I, FRIEDR. ADOLF REIHLEN, of Stuttgart, Würtemberg, Germany, have invented a new and useful Process of Manufacturing Wine, of which the following is a specification.

Heretofore wine has been made by pressing the berries in some suitable press and collecting the juice as it flows off, or the crushed berries were macerated; but in either case the aromatic and coloring matter contained in the skins of the grape was only partially obtained, and most of the juice remained in the mashed skins.

The object of my invention is to provide a new and useful process for making wine, which is simple and produces wine that is very aromatic and rich in color, and which also produces a greater quantity of wine, and permits the skins of the grapes to be used as a fermenting agent.

In carrying out my invention, the grape-berries, which are preferably stripped from the stems, are crushed and pressed in the ordinary manner, and the juice that flows off is collected, and is known as "must" or unfermented wine. The remaining mass, consisting of the skins, seeds, and fleshy part of the grapes, is then brought to a temperature of about 212° Fahrenheit (the boiling-point of water) in a water-bath, in a vat heated by means of a coil, or in a well-tinned kettle, the mass being carefully stirred, so that it cannot burn. This mass of skins, &c., must never be heated in a dry state, and live steam must never be used to heat with. If the mass of grape-skins, &c., has been exposed to the action of the boiling heat of 212° for about two or three minutes, all the minute cells of the skin containing the coloring and aromatic matter of the grape will burst and be opened. The boiled mass of grape-skins, &c., is then macerated with grape-juice or with water, so as to draw the aromatic and coloring matter from the opened cells and embody it in the grape-juice or water, in which it is soluble. When the mass has cooled, the must which was first pressed from the grapes is poured over it and well stirred, upon which this mixture of boiled skins, seeds, and must is allowed to ferment in the ordinary manner; or the mixture of boiled skins, seeds, &c., and must is pressed immediately, the must that flows off being very highly enriched with the aromatic and coloring matter that has been liberated from the skins by the boiling.

The value of the aromatic and coloring matter in the grape-skins has never been esteemed sufficiently, and its beneficial qualities have been overlooked; but the following examples will show the vast importance of securing this coloring and aromatic matter. The must of black or dark grapes fermented without the skins produced wine of the color which is denominated by 1. The same must fermented with the skins (not cooked) brought the color to 4. The same must fermented with the skins (boiled at 212° Fahrenheit) brought the color to 16. The same must fermented with the skins which were cooked, and to which fifty per cent. of water and a quantity of refined sugar was added, until the specific gravity was brought to 1.091, brought the color to 20. In all cases the agreeable taste and flavor of the new wine was in proportion to the quantity or heaviness of color. The coloring-matter can also be extracted without fermentation by washing the skins respectively in cold water, they having been, however, boiled at 212° Fahrenheit. White grapes also produced like results, though not in color, but in taste, which was highly improved by boiling the mashed grapes. These extracted and pure skins, which resemble grayish-white blotting-paper, do excellent service to produce the second fermentation in pure wine that has once fermented, likewise in champagne or in other kind of fruit juice or wine. A small quantity of sugar must be added to produce the second fermentation with the skins. The skins ferment the sugar without any yeast whatever, the liquid remains clear and sparkling, and has a fine taste, something like champagne. The same skins were used two and more times to produce a fermentation.

The skins are a substitute for the best yeast, and convert sugar into carbonic acid, spirit of wine, &c., without all the inconveniences accompanying yeast. Ordinarily about twenty per cent. of the must remained in the grapes, skins, &c., which quantity is now also obtained, so that I not only obtain a better wine, but also a greater quantity, by treating the grapes according to my improved process.

Having thus described my invention, what I claim as new, and desire to secure by Letters Patent, is—

In the process of making wine from grapes, the sub-process which consists in exposing for a few minutes to a water-bath kept at a temperature of 212° Fahrenheit the mass of seed, flesh, and skins remaining after expression of the must; secondly, macerating them in water or grape-juice; and, thirdly, mixing them with the must, as described.

FRIEDR. ADOLF REIHLEN.

Witnesses:
GEORGE L. CATLIN,
R. M. JACKSON.